United States Patent [19]

Katz et al.

[11] Patent Number: 4,994,954

[45] Date of Patent: Feb. 19, 1991

[54] CONTROL CIRCUIT FOR REGULATING A CURRENT FLOW THROUGH A LOAD AND USE THEREOF

[75] Inventors: Hanspeter Katz, Stuttgart; Franz Ohms, Oberrot, both of Fed. Rep. of Germany

[73] Assignee: ANT Nachrichtentechnik GmbH, Backnang, Fed. Rep. of Germany

[21] Appl. No.: 454,014

[22] Filed: Dec. 20, 1989

[30] Foreign Application Priority Data

Dec. 22, 1988 [DE] Fed. Rep. of Germany ....... 3843260

[51] Int. Cl.[5] .......................................... H02M 7/155

[52] U.S. Cl. .................................. 363/89; 323/271; 323/282; 323/351; 363/125; 363/127

[58] Field of Search ................. 363/89, 125, 126, 127; 323/265, 271, 273, 282, 283, 349, 351

[56] References Cited

U.S. PATENT DOCUMENTS 4,302,717 11/1981 Olla ................................ 363/89 X 4,488,162 8/1987 Mutch et al. .................. 363/126 X

FOREIGN PATENT DOCUMENTS 3130571 7/1983 Fed. Rep. of Germany .

3741222 12/1988 Fed. Rep. of Germany .

OTHER PUBLICATIONS

U. Tietze & Ch. Schenk; "Halbleiter-Schaltungstechnik" (Semi Conductor Switching Technology); 2nd Edition; Springer-Verlag Berlin; (pp. 338–340), Heidelberg, N.Y., 1971.

*Primary Examiner*—Steven L. Stephan
*Assistant Examiner*—Emanuel Todd Voeltz
*Attorney, Agent, or Firm*—Spencer & Frank

[57] ABSTRACT

A regulator controls the DC current flowing through a load, where the current is initially supplied by an AC voltage source and thereafter rectified, the control being proportional to the load current. In one embodiment, the source or emitter potential of a transistor which functions as a control element is changed by a current source such that a current of predetermined strength flows through the control element transistor. The control current for the current source is derived from a current sensor in the load circuit. Additionally, a constant gate potential for the transistor control element is obtained through the current sensor. This circuit is preferably suitable for the regulation of the cathode current of travelling-wave tubes.

13 Claims, 3 Drawing Sheets

CONTROL CIRCUIT FOR REGULATING A CURRENT FLOW THROUGH A LOAD AND USE THEREOF

BACKGROUND OF THE INVENTION

The present invention relates to a control circuit for regulating current flowing through a load and to a use of such a control circuit More specifically, the present invention relates to a regulator control for a circuit where an AC input is rectified to provide a DC signal which is supplied to a load and wherein a current sensor is coupled by a transformer between the AC input and the rectifier to sense the load current and provide signals to a regulator control. The present invention has particular utility in regulating the cathode current of travelling wave tubes.

German Published Patent Application No. DE-37 41 222 C1, published Dec. 15, 1988, suggests the provision of a current sensor or current converter in a load circuit for "potential free" (e.g., transformer coupled) control of the load current, where the signal to be supplied to a control device was obtained by detecting and rectifying the current with a current sensor.

U. Tietze and Ch. Schenk, in "Halbleiter-Schaltungstechnik" [Semiconductor Circuit Technology], 2nd Edition, 1971, pp. 338 to 340, published by Springer-Verlag discloses the use of a control element in the form of a transistor in a load circuit for regulating the current, where the collector or emitter transistor current is measured with a measuring resistor and the transistor base current is regulated in response to the measured current.

U.S. Pat. No. 4,688,162 Mutch et al. issued Aug. 18th, 1987, discloses a device for regulating the current flowing through a load, where the voltage from an AC source is rectified and thereafter supplied to the load and wherein a current regulator is controlled or regulated dependent on the source and load currents. The AC source current is detected by means of a current detector and is compared with the load current, after having been transformed, and the regulation deviation or difference derived from this comparison is used to control the control element of the current regulator for improving the efficiency of the device. See, in particular the abstract and column 2, line 59 to column 3, line 43, together with FIG. 1.

German Patent No. 31 30 571 C2 of Jul. 21st, 1983, discloses a device in the form of a forward converter for regulating the current flowing through a load R, where a current sensor Dr supplies, free of potential (e.g., transformer coupled), a voltage which is proportional to the load current and which, after having been correspondingly rectified, is used as supply voltage for the control and regulating portion of the forward converter. See, in particular the claim and the drawing figure.

The present invention provides a new and improved form of fast load current regulation wherein the load current is sensed "free of potential," e.g., by use of a transformer.

SUMMARY OF THE INVENTION

It is an object of the invention to provide a control circuit for regulating the current flowing through a load wherein voltage from an AC voltage source is rectified by a first rectifier and thereafter supplied to a load as a direct current, and wherein a current sensor is located between the AC voltage source and the first rectifier, the current sensor providing an output signal proportional to the load current, such that fast regulation of the load current is possible, and wherein the control circuit itself is "potential-free," i.e., a floating potential, and wherein the load is detected by a transformer having a winding with one or more turns in the load circuit.

The control circuit of the present invention has as an advantageous use, cathode current regulation of a travelling wave tube.

The various objects and benefits of the present invention are attained in a circuit wherein a control means is regulated to supply current to a load and wherein the output of a load current sensor is rectified by a second rectifier circuit and supplied to a current measuring resistor and to an auxiliary voltage regulator and to a constant voltage element. The auxiliary voltage regulator is controlled by the voltage drop at the current measuring resistor and is connected to one of the terminals of the control means.

The present invention further provides a control circuit for regulating current flowing through a load wherein the control means is a FET having at least one Zener diode connected between the source and drain electrodes.

The present invention further provides a control circuit for regulating current flowing through a load wherein the control means comprises cascaded transistors each of which has at least one Zener diode connected between its respective source and drain electrodes, and wherein the cascaded transistors are sequentially switched to be conductive.

The present invention further provides a utilization for a control circuit for regulating the cathode current of a travelling wave tube.

The present invention makes it possible to detect, free of potential, i.e., at a floating potential, the current to be regulated for supplying a control circuit with a required supply voltage—at any desired potential—and to achieve fast regulating action, in particular by the use of an emitter or source potential controller with the aid of an integrated voltage regulator and a current measuring resistor as a current source. The present invention is suitable for use with high voltage current sources, in particular for cathode current regulation of travelling-wave tubes. Because of the simple construction and the dependability of the control circuit of the present invention it is suitable for use in satellites.

BRIEF DESCRIPTION OF THE DRAWINGS

The foregoing objects and advantages of the present invention, together with other benefits and advantages which may be attained by its use, will become more apparent upon reading the following detailed description of the invention taken in conjunction with the drawings. In the drawings, wherein like reference numerals identify corresponding components.

DETAILED DESCRIPTION OF THE INVENTION

Figure 1:
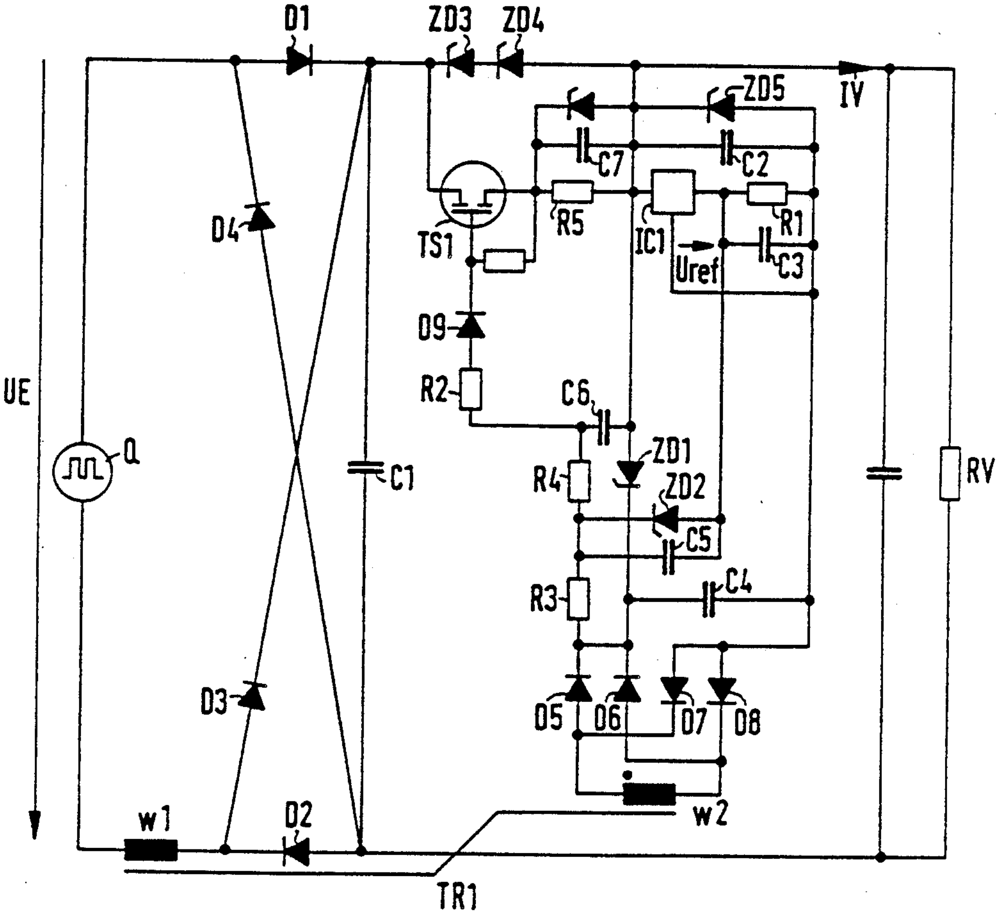
FIG. 1 is a circuit diagram of a current regulating circuit having a field effect transistor as control o element according the principles of the present invention.

Referring first to FIG. 1, a voltage supply source Q supplies a load current IV via a current regulator means to a load RV. In this case, the voltage supply source Q is an AC voltage source which may be the voltage at the secondary coil of the converter of a push-pull converter. The input voltage UE supplied by the AC voltage source Q is rectified by means of a first rectifier such as a diode bridge circuit comprising diodes D1, D2, D3, and D4 and is smoothed by means of a capacitor C1. The load RV is supplied with the rectified and smoothed supply voltage via the control means or control member TS1, which, in the embodiment of FIG. 1, is a MOS field effect transistor (MOS FET). The load current IV is detected by a current sensor TR1, which is placed in the return line for the load current IV between the AC voltage source Q and the diode D2 of the first rectifier bridge circuit. In the present invention the current sensor TR1 is a transformer having a primary winding w1 in the return line between the AC voltage source Q and the diode D2, which senses the load current "potential free" and in response thereto provides an output signal on the secondary winding w2 of the transformer. The floating potential value of the output signal of the current sensor TR1 is proportional to the load current IV.

The control member of the present invention requires supply and regulating voltages both of which are also supplied from the output of the current sensor TR1 as will be explained. The voltage appearing at the secondary winding or secondary coil w2 of the current sensor TR1 is rectified by means of a second rectifier circuit which is illustrated as a second diode bridge circuit comprising four diodes D5, D6, D7 and D8. The output of diodes D5 and D6 provides a positive potential terminal and a first series circuit, comprising sequentially connected resistors R3, R4, R2 and a diode D9, is located between this positive potential terminal and the gate of the MOS FET TS1. The diode D9 is connected with its polarity such that the MOS FET TS1 is conductively controllable when the positive potential is supplied by the second rectifier circuit. The resistor R2 represents the gate resistance of the MOS FET TS1. The resistor R3, together with a capacitor C6, constitutes a smoothing filter.

Means are provided for supplying a constant voltage in the nature of a constant gate potential to the control element TS1. Specifically, a Zener diode ZD2 has its cathode connected to the junction of resistors R3 and R4, and a capacitor C5 is connected across the Zener diode ZD2. The combination of the resistor R3, the Zener diode ZD2 and capacitor C5 generates a constant, i.e. independent from the load current, gate potential. The anode of the Zener diode ZD2 is connected to the junction of an integrated voltage regulator IC1 and a current measuring resistor R1. The source electrode of the MOS FET is connected via a source negative feedback resistor R5 to the load RV.

The source electrode of the MOS FET TS1 is further connected via a current source to the negative side of the second rectifier. Specifically, the output of diodes D7 and D8 of the second diode rectifier circuit provides a negative potential which is connected to on side of resistor R1. The opposite side of resistor R1 is connected in series with a auxiliary voltage regulator IC1, and then through resistor R5 to the source electrode. Thus resistor R1 functions to measure the second diode bridge rectifier circuit output.

The current, sensed and rectified by the current sensor TR1 and the second bridge circuit, flows mainly along a current path between the positive potential terminals of the second bridge circuit, the Zener diode ZD7 and the series circuit of the voltage regulator IC1 and the current measuring resistor R1 back to the current sensor TR1. The remaining sensed current flows via resistor R4 to drive transistor TS7 and via Zener diode ZD2. All these currents are summed up at measuring resistor R7. The output of the voltage regulator IC1 adjusts the source potential of the MOS FET TS1 which regulates the voltage drop at the MOS FET TSI until the load current IV becomes proportional to the current through the current measuring resistor R1. In this case $$IV = \ddot{u} \cdot U_{ref}/R1$$

applies, where ü is the conversion ratio of the current converter TRI and $U_{ref}$ is the reference voltage of the voltage regulator IC1.

In order to protect the control means which in the embodiment of FIG. 1 is a MOS FET TS1, one or several Zener diodes are connected between the source-to drain electrodes of the MOS FET. FIG. 1 illustrates two such Zener diodes ZD3, ZD4, connected in series, which protect the control means from excessively high inverse voltages. A Zener diode ZD5 similarly protects the integrated voltage regulator ICI from excessive voltage. A capacitor C2 is provided across the series connection of regulator IC1 and resistor R1, a second capacitor C3 is connected in parallel with resistor R1, capacitor C4 has one side connected at the anode of Zener diode ZD1 and the other side connected to the negative potential terminals from the output of the second diode bridge circuit, and capacitor C7 is connected across resistor R5. These four capacitors C2, C3, C4 and C7 allow the setting of the desired value and phase flow of the regulator IC1.

Figure 2:
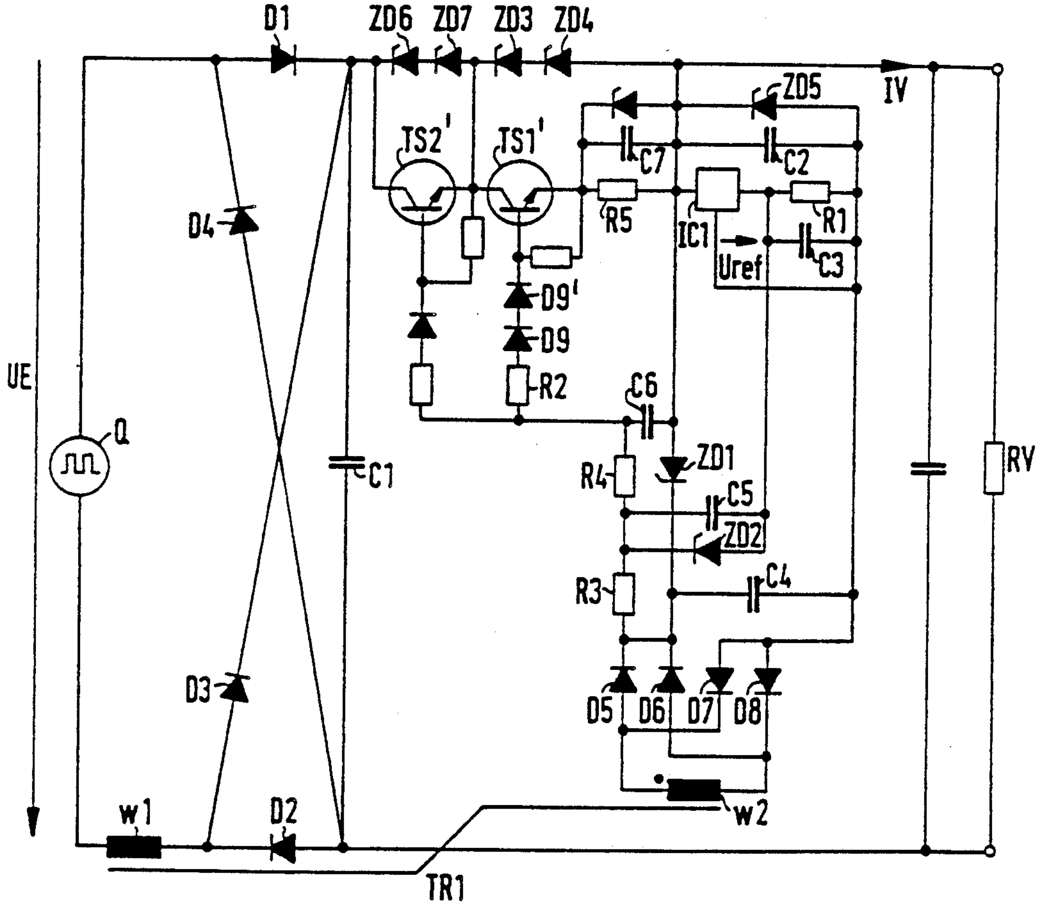
FIG. 2 is a circuit diagram of a current regulating circuit having cascaded transistors as the control element according to the principles of the present invention.

Reference should now be had to FIG. 2 for an illustration of a modification of the present invention. A bipolar transistor may be used as a control means in place of an MOS FET. In the exemplary embodiment in accordance with FIG. 2, the control means is illustrated as cascaded transistors, comprising the two bipolar transistors TS1' and TS2', whose collector-emitter current paths are connected in series. Regulation is performed in the same manner as regulation of control means TS1 of FIG. 1, except that in the embodiment of FIG. 2, the two transistors TS1' and TS2' are consecutively rendered conductive which permits a greater control deviation. In the embodiment of FIG. 2, the base potentials of the two transistors are maintained constant via the Zener diode ZD2 and the resistors R3 and R4. Series connected Zener diodes ZD6 and ZD7 are connected across the collector-emitter of transistor TS2' and series connected diodes ZD3 and ZD4 are connected across the collector-emitter of transistor TS1'. If the current through the current measuring resistor R1 is small, the load current IV first flows through the Zener diodes ZD6, ZD7, ZD3 and ZD4, which are connected in parallel with the collector-emitter paths of the transistors TS1' and TS2'. The control deviation then is 2UCE, where UCE is the collector-emitter voltage of a transistor. If the emitter potential of the cascade (emitter of TS1') is lowered, the transistor TS1' is initially conductively controlled. No current will flow through the Zener diodes ZD3 and ZD4 as the load current IV flows via the Zener diodes ZD6, ZD7 and the collector-emitter path of the transistor TS1'. In this case the control deviation lies between UCE and 2UCE. If the emitter potential of the transistor TS1' is further lowered, the transistor TS2' additionally becomes conductive and no current flows through the Zener diodes ZD3 and ZD4, in which case the control deviation lies between O and UCE.

Figure 3:
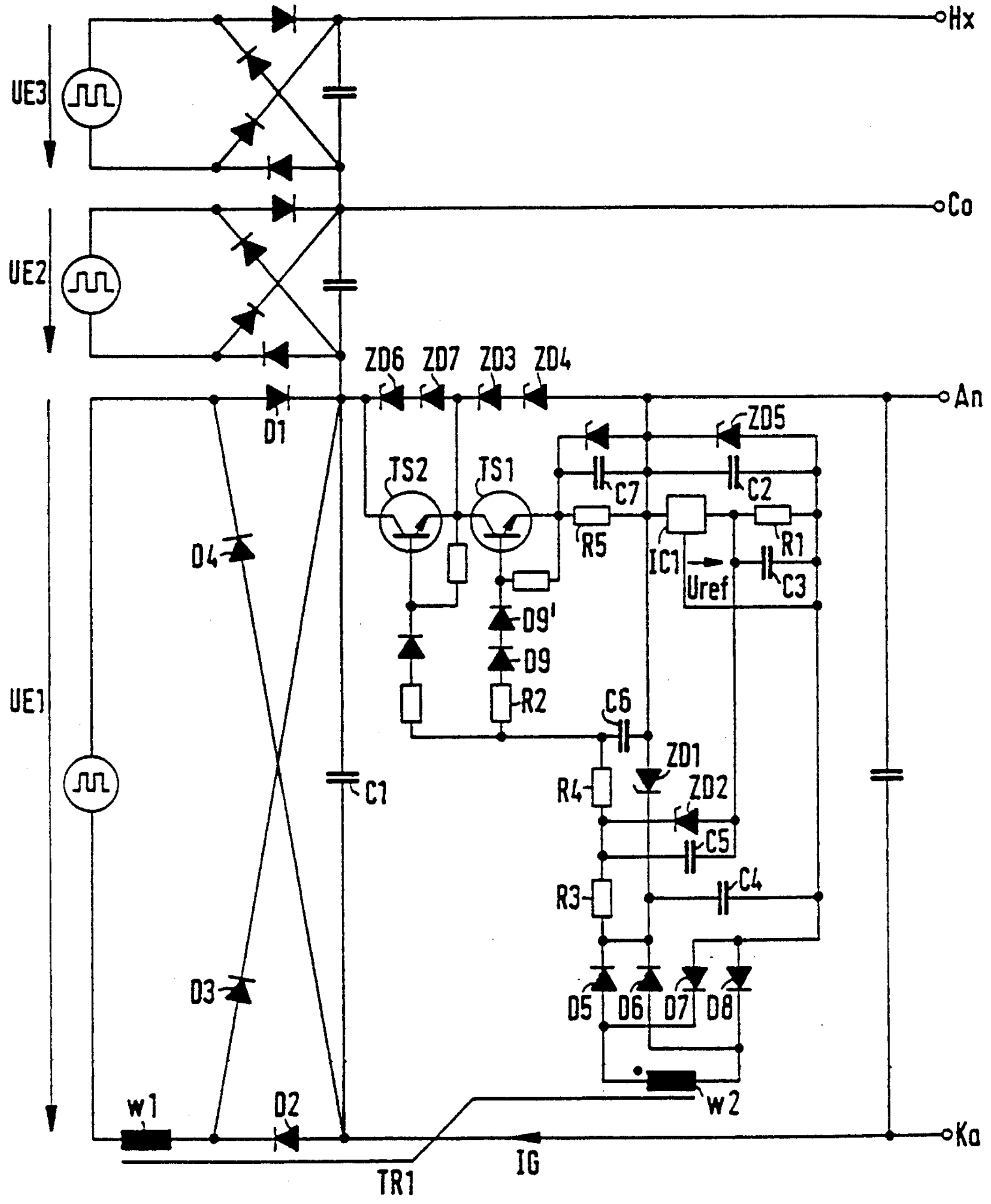
FIG. 3 is a circuit diagram of a regulating circuit for cathode current regulating of a travelling-wave tube according to the principles of the present invention.

Referring next to FIG. 3, a utilization of the present invention is illustrated as a control circuit for cathode current regulation of a travelling-wave tube with serial voltage generation. That is to say, supply voltages for a cathode Ka, an anode An, a collector Co and a helix Hx (of a travelling wave tube) are obtained by rectification from pulse voltages UE1, UE2 and UE3, respectively, and are serially stacked on top of each other. In this embodiment, the primary coil w1 of the current sensor TR1 senses the total current IG flowing in a common current return of the travelling-wave tube. The voltage regulator block IC7 can be the integrated circuit SG777 manufactured by Silicon General or any similar positive adjustable voltage regulator.

The foregoing is a complete description of the preferred embodiment of the present invention. Many changes may be made without departing from the spirit and scope of the invention. The invention, therefore, should be limited only by the following claims.

What is claimed is:

1. In a circuit wherein the output of an AC voltage source is rectified by a first rectifier and thereafter supplied as direct current via a regulator means to a load, and wherein a current sensor positioned between the first rectifier and the AC voltage source provides first potential free, i.e., floating potential, output signal proportional to the load current, the improvement characterized by:

the regulator means including a control element in series with the load and having at least one load terminal and one control terminal;

means for rectifying the output of the current sensor;

a first circuit including a series connection of a first constant voltage element, an auxiliary voltage regulator and a first current measuring resistor; said first circuit receiving the output from said current sensor rectifying means, the junction of the first constant voltage element and the auxiliary voltage regulator operably connected to one of the load current conducting terminals of the control element; and a second circuit including a series connection of a second constant voltage element, a resistor, and said first current measuring resistor; said second circuit also receiving the output from said current sensor rectifying means, the junction of the resistor and the second constant voltage element connected to the control terminal of the control element.

2. The invention as defined in claim 1 wherein the control element comprises a bipolar transistor whose current conductive path is in series with the load and is in parallel with at least one Zener diode.

3. The invention as defined in claim 1 wherein the control element comprises a MOS FET whose source-drain path is in series with the load and is in parallel with at least one Zener diode.

4. The invention as defined in claim 1 wherein the control element comprises cascaded transistors having their emitter-collector paths in series with the load.

5. The invention as defined in claim 4 wherein the control element includes at least one protective Zener diode connected in parallel with the emitter-collector paths.

6. The invention as defined in claim 4 wherein the control element includes means connecting each emitter-collector path in series with the load.

7. The invention as defined in claim 6 wherein the control element includes at least one protective Zener diode connected in parallel with each emitter-collector path.

8. The invention as defined in claim 4 wherein the cascaded transistors are sequentially conducting.

9. The invention as defined in claim 1 wherein the load current is the cathode current of a travelling-field tube during serial electrode voltage generation.

10. The invention as defined in claim 2 wherein the load current is the cathode current of a travelling-field tube during serial electrode voltage generation.

11. The invention as defined in claim 3 wherein the load current is the cathode current of a travelling-field tube during serial electrode voltage generation.

12. The invention as defined in claim 4 wherein the load current is the cathode current of a travelling-field tube during serial electrode voltage generation.

13. The invention as defined in claim 6 wherein the load current is the cathode current of a travelling-field tube during serial electrode voltage generation.

* * * * *